(No Model.)
A. W. BUSH.
FOOT POWER.
No. 269,635.  Patented Dec. 26, 1882.
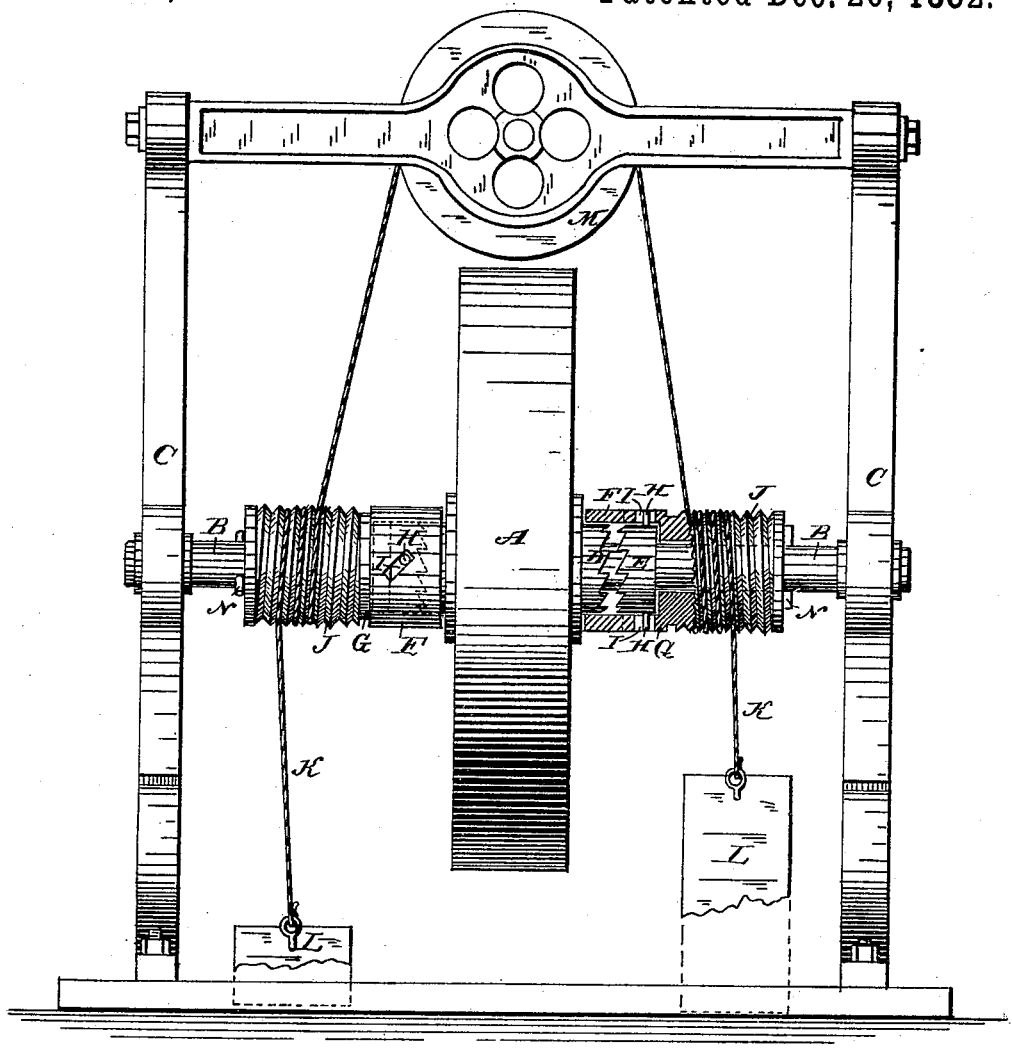

UNITED STATES PATENT OFFICE.

ARTHUR W. BUSH, OF BOULDER, COLORADO.

FOOT-POWER.

SPECIFICATION forming part of Letters Patent No. 269,635, dated December 26, 1882.

Application filed May 23, 1882. (No model.)

*To all whom it may concern:*

Be it known that I, ARTHUR W. BUSH, of Boulder, in the county of Boulder and State of Colorado, have invented a new and Improved Foot-Power, of which the following is a full, clear, and exact description.

This invention relates to an improvement in contrivances or apparatus to convert treadle motion into rotary motion; and it consists of a shaft carrying a driving-pulley with a ratchet-collar affixed thereto or to its shaft, and a clutch loose thereon, and having a stud or projection combined with a drum provided with a sleeve or collar inclosing the said ratchet and clutch, and having an oblique slot, which receives the clutch, stud, or projection, an intermediately coiled rope or its equivalent, a treadle, and a carrier roll or pulley, substantially as hereinafter more fully set forth and claimed.

Reference is to be had to the accompanying drawing, forming part of this specification, which shows a front elevation of my improved foot-power apparatus, with a part in section.

A represents a driving-pulley mounted on a shaft, B, which has bearings in the frame C. The wheel A has a ratchet-hub, D, on each side, with which a rose-clutch, E, is provided, said clutch being fitted in the hollow end F of a drum, G, so as to turn on and shift along shaft B, and being provided with stud-pins H, working in short spiral slots I of the drums. Said drums are free to turn on the shaft B; but they are prevented from shifting endwise by the hub of the wheel and the pins N. They have spiral grooves J in the periphery, around which the working-cord K winds a few turns, said cord being attached to the foot-treadles L, and also passing from one drum, G, to the other over the carrier-pulley M, located in the frame above the driving-pulley A, or it may be under said pulley, if preferred. The teeth of the clutches are pitched so that they both engage so as to turn the pulley A in the same direction, and the slots I of the drums F G are so inclined with respect to the teeth that when the drums cease to turn with the pulley the clutches will disengage from hubs D by sliding out of gear with them along the slots I. Thus when a foot is applied to one of the treadles the drum of that side will be pulled forward and the clutch engaged with the pulley for turning it, while the drum of the other side will be running backward to raise the treadle. The treadles and the drums reverse in the usual order of such contrivances, and thus impart continuous rotation to the pulley A. By passing the cord over the carrier-pulley M, between the drums G, said pulley and cord take off the downward stress from the drums that exists in the arrangements in which springs are employed for retracting the drums, thus lessening the friction, and by employing the sliding clutches E and inclined slots I in drums F G to work them the machine runs with less noise than those in which ratchets and pawls with springs are employed.

I do not limit myself to the employment of a cord for the driving-belt, for a flat leather or other belt may be used.

Having thus fully described my invention, I claim as new and desire to secure by Letters Patent—

In a foot-power contrivance or apparatus, the combination, with the shaft B, having the driving-wheel A, with the ratchet-collar D affixed thereto or to its shaft, and the clutch E, loose on said shaft, and having the stud or projection H, drum G, having a sleeve or hub, F, provided with an oblique slot, I, which receives the stud or projection H of the clutch E, the intermediately coiled rope, K, or its equivalent, treadle L, and carrier-pulley M, substantially as and for the purpose set forth.

ARTHUR W. BUSH.

Witnesses:
SAMUEL HEILNER,
H. P. ALDEN.